United States Patent
Morita et al.

(10) Patent No.: US 7,150,158 B2
(45) Date of Patent: Dec. 19, 2006

(54) FREEZING PREVENTION SYSTEM FOR REFRIGERATION DEVICE AND AIR CONDITIONER USING THE SAME

(75) Inventors: Takayuki Morita, Nagoya (JP); Yuji Honda, Okazaki (JP)

(73) Assignee: Denso Corporation, Kariya (JP)

( * ) Notice: Subject to any disclaimer, the term of this patent is extended or adjusted under 35 U.S.C. 154(b) by 402 days.

(21) Appl. No.: 10/751,348

(22) Filed: Jan. 5, 2004

(65) Prior Publication Data

US 2004/0134207 A1 Jul. 15, 2004

(30) Foreign Application Priority Data

Jan. 9, 2003 (JP) ............................. 2003-003579

(51) Int. Cl.
*G05D 28/32* (2006.01)
(52) U.S. Cl. ............................. 62/158; 62/227; 62/156; 62/158
(58) Field of Classification Search ................... 62/227, 62/151, 139, 156, 228.1; 236/78 D
See application file for complete search history.

(56) References Cited

U.S. PATENT DOCUMENTS 170,707 A * 12/1875 Shibata et al. .............. 473/411
6,330,909 B1 * 12/2001 Takahashi et al. .......... 165/202
6,427,465 B1 * 8/2002 Bednarchik et al. .......... 62/227

FOREIGN PATENT DOCUMENTS

| JP | 2000-258001 | 9/2000 |
| JP | 2003-65639 | 3/2003 |

* cited by examiner

*Primary Examiner*—Cheryl Tyler
(74) *Attorney, Agent, or Firm*—Harness, Dickey & Pierce, PLC

(57) ABSTRACT

A freezing prevention system for a refrigeration device includes a freezing-prevention temperature sensor for detecting a refrigerant temperature in a refrigerant evaporator, and a control unit for controlling operation of a refrigerant compressor based on the detected refrigerant temperature. The control unit includes a calculating means for calculating an integral value of the detected refrigerant temperature integrating with respect to a passed time after the detected refrigerant temperature becomes equal to or lower than 0° C. When the integral value becomes equal to or larger than a predetermined value, the control unit stops the operation of the refrigerant compressor. Accordingly, the freezing prevention system can accurately perform a freezing prevention control while its production cost can be reduced.

12 Claims, 4 Drawing Sheets

FREEZING PREVENTION SYSTEM FOR REFRIGERATION DEVICE AND AIR CONDITIONER USING THE SAME

CROSS-REFERENCE TO RELATED APPLICATION

This application is related to Japanese Patent Application No. 2003-3579 filed on Jan. 9, 2003, the content of which is hereby incorporated by reference.

BACKGROUND OF THE INVENTION

1. Field of the Invention

The present invention relates to a freezing prevention system for a refrigeration device such as a vehicle air conditioner. More particularly, the present invention relates to a freezing prevention control for preventing a refrigerant evaporator from freezing.

2. Description of Related Art

A freezing prevention system of a refrigeration device includes an air temperature sensor that is disposed downstream of a refrigerant evaporator in an air flow direction for detecting an air temperature at an air outlet side of the refrigerant evaporator. In the freezing prevention system, a freezing prevention control is performed such that operation of a compressor is stopped when an air temperature detected by the air temperature sensor reduces lower than a predetermined temperature. Generally, even when a surface temperature of the evaporator changes rapidly, the air temperature detected by the air temperature sensor cannot be changed rapidly in accordance with this rapid temperature change of the surface temperature.

To overcome this problem, in a freezing prevention system disclosed in JP-A-2000-258001, an air flow reducing member is disposed to reduce an air flow rate at an outlet side of an evaporator, and a freezing-prevention temperature sensor is disposed in an air flow reducing area of the air flow reducing member. Further, an air flow increasing member is disposed to increase an air flow rate at the outlet side of the evaporator, and a re-start temperature sensor is disposed in an air flow increasing area of the air flow increasing member. In addition, operation of a compressor is controlled based on the detected temperatures of the freezing-prevention temperature sensor and the re-start temperature sensor. However, in the freezing prevention system disclosed in JP-A-2000-258001, when the response performance of the temperature sensors is increased, an operation starting frequency and an operation stopping frequency of the compressor are increased, thereby reducing durability of a solenoid clutch, and worsening drivability and dehumidifying performance. Further, the freezing-prevention temperature sensor, the re-start temperature sensor, the air flow reducing member, the air flow increasing member and the like are required. Therefore, production cost of this freezing prevention system is increased.

SUMMARY OF THE INVENTION

In view of the above problem, it is an object of the present invention to provide a freezing prevention system for a refrigeration device, which accurately a freeze prevention control of a refrigerant evaporator.

It is another object of the present invention to provide a freezing prevention system having a control unit capable of accurately performing freezing prevention control based on a freeze determination value containing a latent heat amount in a predetermined volume of condensed water.

It is a further another object of the present invention to provide an air conditioner having the freezing prevention system.

According to the present invention, a freezing prevention system for a refrigeration device includes a temperature detection unit disposed in a refrigerant evaporator for detecting a refrigerant temperature in the refrigerant evaporator, and a control unit for controlling operation of a refrigerant compressor based on the refrigerant temperature detected by the temperature detection unit. In the freezing prevention system, the control unit includes a calculating means for calculating an integral value of the detected refrigerant temperature integrating with respect to a passed time after the detected refrigerant temperature becomes equal to or lower than a predetermined integrating start temperature, and the control unit stops the operation of the refrigerant compressor when the integral value calculated by the calculating means becomes equal to or larger than a predetermined value. Accordingly, the freezing prevention control can be accurately performed in the freezing prevention system in low cost. For example, the predetermined value can be calculated by a latent heat amount in a predetermined volume of condensed water in the refrigerant evaporator.

Preferably, the temperature detection unit is a temperature sensor disposed on the refrigerant evaporator to detect a surface temperature of the refrigerant evaporator. For example, the refrigerant evaporator includes a plurality of tubes in which the refrigerant after being cooled and decompressed flows, and a plurality of fins each of which is disposed between the tubes. In this case, the temperature detection unit can be arranged to detect the surface temperature of the tube or the fin.

Further, the temperature detection unit can be arranged on the tube or the fin at a position separated at least by a predetermined distance from a bottom end of the refrigerant evaporator in the vertical direction. In this case, the temperature detection unit can more accurately detect the temperature relating to the refrigerant temperature in the refrigerant evaporator.

More preferably, the control unit further includes another calculating means for calculating another integral value of the detected refrigerant temperature integrating with respect to a passed time after the detected refrigerant temperature becomes higher than the predetermined integrating start temperature. In this case, the control unit re-starts the operation of the refrigerant compressor when the another integral value calculated by the another calculating means becomes equal to or larger than a predetermined re-start value. Therefore, the stop operation and the re-start operation of the refrigerant compressor can be more accurately controlled.

The freezing prevention system can be suitably used for an air conditioner. In this case, it can accurately prevent the refrigerant evaporator from freezing in the air conditioner.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

(First Embodiment)

Figure 1:
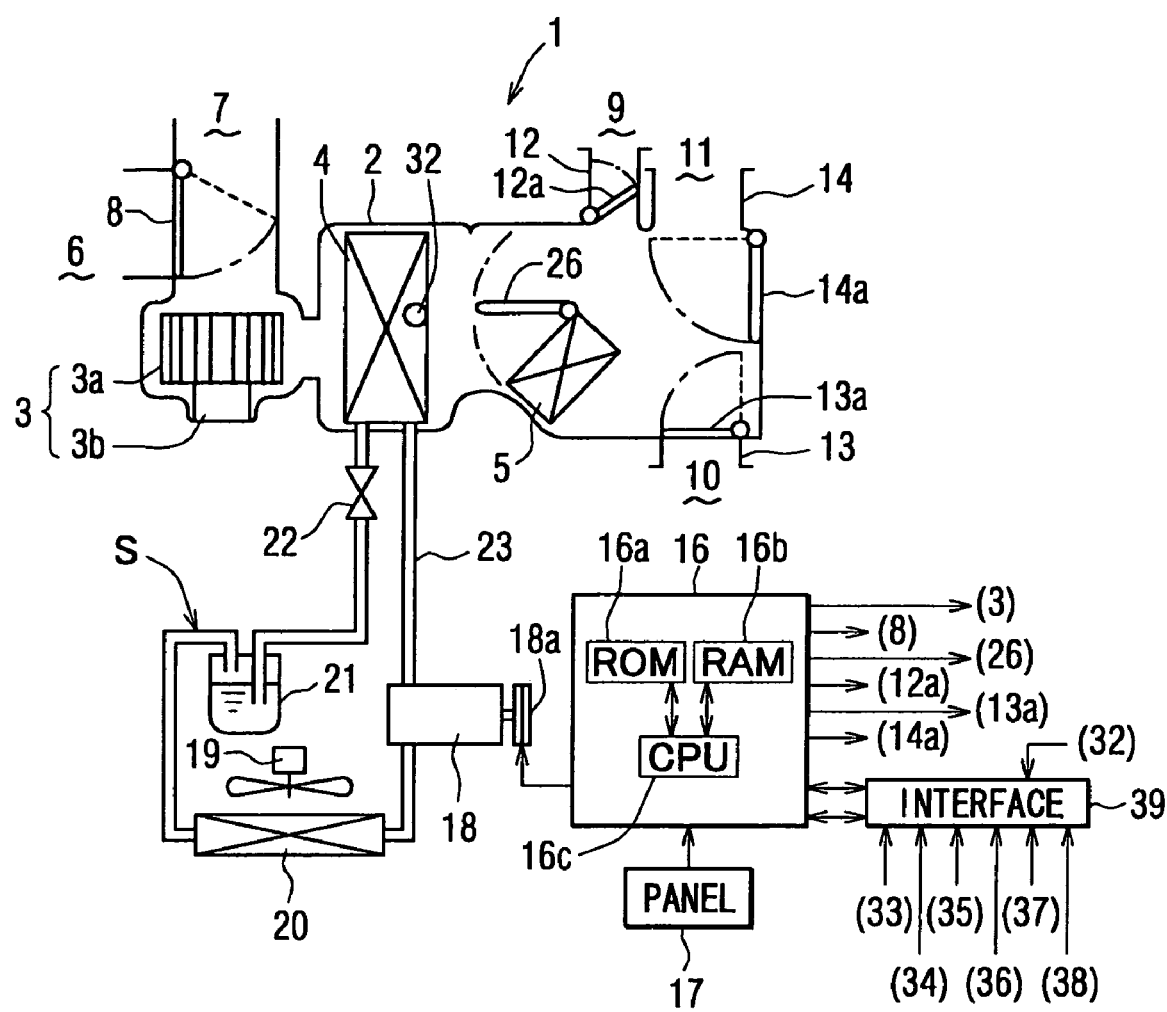
FIG. 1 is a schematic diagram showing a refrigeration device with a freezing prevention system according to a first preferred embodiment of the present invention.

The first embodiment of the present invention will be now described with reference to FIGS. 1–4. In the first embodiment, a freezing prevention system of a refrigeration device is typically used for a vehicle air conditioner. As shown in FIG. 1, a vehicle air conditioner 1 with a refrigeration device includes an air conditioning case 2, a blower 3, a refrigerant cycle S used as a cooling unit, and a heater core 5 used as a heating unit. Air is blown by the blower 3 into the air conditioning case 2, and is introduced into a passenger compartment through an air passage of the air conditioning case 2. The refrigerant cycle S includes a refrigerant evaporator 4 disposed in the air conditioning case 2, and the heater core 5 is disposed in the air conditioning case 2 downstream of the refrigerant evaporator 4.

The air conditioning case 2 has an inside air inlet 6 and an outside air inlet 7 at its upstream end. The inlets 6, 7 are opened and closed by an inside-outside air switching door 8 in accordance with a selected inside-outside air mode. Air is blown into the passenger compartment from air outlets such as a defroster air outlet 9, a foot air outlet 10 and a face air outlet 11 through branch air ducts 12, 13, 14 connected at downstream end sides of the air conditioning case 2. Thus, conditioned air after being thermal-adjusted is blown from the defroster air outlet 9 toward a windshield through the branch air duct 12. Conditioned air is blown from the foot air outlet 10 toward the foot portion of a passenger in the passenger compartment through the branch air duct 13. Further, conditioned air is blown from the face air outlet 11 toward the upper half body of the passenger in the passenger compartment through the branch air duct 14.

Upstream opening portions of the branch air ducts 12, 13, 14 are opened and closed by the air-outlet mode doors 12a, 13a, 14a in accordance with a selected air outlet mode, respectively. The air-outlet mode doors 12a–14a are disposed upstream of the branch air ducts 12–14, respectively. As the air outlet mode, a face mode, a bi-level mode, a foot mode and a defroster mode can be set, for example. In the face mode, cool air is blown from the face air outlet 11 to the upper half body of the passenger in the passenger compartment. In the bi-level mode, cool air is blown from the face air outlet 11 to the upper half body of the passenger, and warm air is blown from the foot air outlet 10 to the foot portion of the passenger in the passenger compartment, so that comfortable temperature distribution of "cool head and warm foot" can be obtained. In the foot mode, warm air is blown from the foot air outlet 10 toward the foot portion of the passenger in the passenger compartment, thereby performing heating operation in the passenger compartment. In the defroster mode, conditioned air is blown from the defroster air outlet 9 toward the windshield, thereby defrosting the windshield.

The blower 3 includes a centrifugal fan 3a, and a fan motor 3b for rotating the centrifugal fan 3a. A rotation speed of the centrifugal fan 3a is determined by a voltage applied to the fan motor 3b. The voltage applied to the fan motor 3b is controlled based on a control signal output from a control unit 16 described later, through a motor drive circuit (not shown).

The refrigerant cycle S includes a refrigerant compressor 18, a refrigerant condenser 20, a receiver 21, an expansion valve 22 and the refrigerant evaporator 4. These components of the refrigerant cycle S are connected by refrigerant piping 23 to form a circle. The refrigerant compressor 18 is driven by receiving rotation force of a vehicle engine (not shown), and compresses refrigerant. The refrigerant compressor 18 includes a solenoid clutch 18a that is controlled to be energized through a compressor drive circuit (not shown). Operation of the refrigerant compressor 18 is controlled by on-off control of the solenoid clutch 18a. The refrigerant condenser 20 cools and condenses high-temperature high-pressure refrigerant compressed by and discharged from the refrigerant compressor 18, by performing heat exchange with air blown by a cooling fan 19. The receiver 21 temporarily stores refrigerant introduced from the refrigerant condenser 20, and discharges only liquid refrigerant to the expansion valve 22. The expansion valve 22 decompresses and expands refrigerant flowing from the receiver 21. The refrigerant evaporator 4 evaporates refrigerant after being decompressed by the expansion valve 22, by absorbing heat from air blown by the blower 3. Therefore, air passing through the evaporator 4 is cooled.

Figure 2:
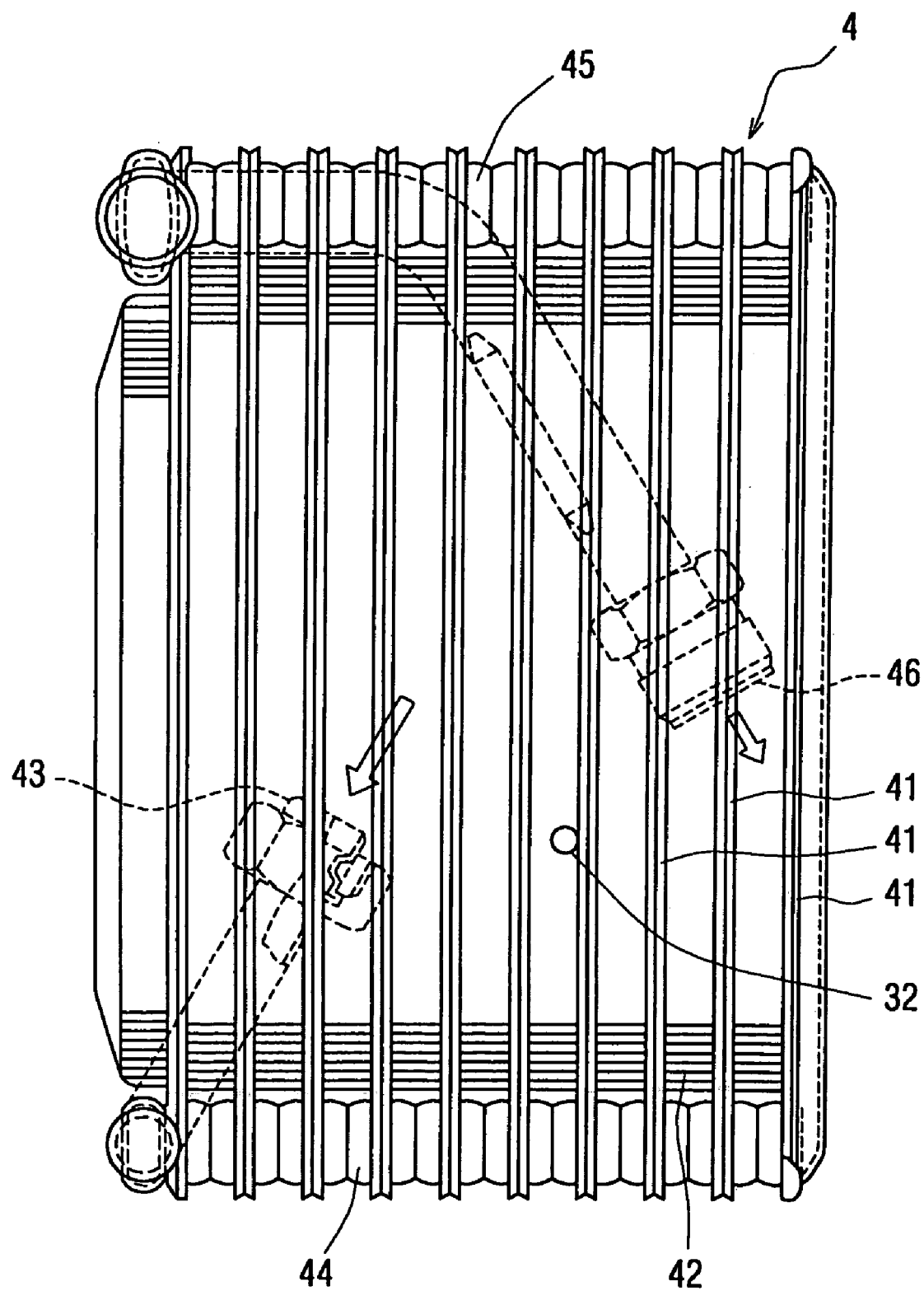
FIG. 2 is a front view showing a refrigerant evaporator according to the first embodiment.

As shown in FIG. 2, the refrigerant evaporator 4 is a stack type evaporator. The refrigerant evaporator 4 includes plural tubes 41, and plural fins 42 each of which is disposed between the tubes 42. The plural tubes 41 are disposed so as to extend in an up-down direction, and are disposed in parallel to each other. Liquid refrigerant from the receiver 21 flows into the expansion valve 22, and the decompressed refrigerant decompressed in the expansion valve 22 flows into a lower tank 44 through a refrigerant inlet 43. Gas refrigerant evaporated in the refrigerant evaporator 4 is sucked from an upper tank 45 into the refrigerant compressor 18 through a refrigerant outlet 46. While gas-liquid two-phase refrigerant flows through the tubes 41, the liquid refrigerant is evaporated.

A freezing-prevention temperature sensor 32, for detecting a temperature (e.g., surface temperature of the refrigerant evaporator 4 in the first embodiment) of refrigerant flowing upward from the lower tank 44 to the upper tank 45, is disposed on an outer surface of the tube 41 at a downstream air side position in the refrigerant evaporator 4. Generally, because condensed water flows on the tubes 41 from an upper side to a lower side, the condensed water readily stores at a lower side of the refrigerant evaporator 4. Thus, preferably, the freezing-prevention temperature sensor 32 is disposed on the tube 41 at a position except for a lower portion, for example, at a position above the lower tank 44 by 50 mm or more. That is, the freezing-prevention temperature sensor 32 is disposed at a position in the refrigerant evaporator 4 separated from the bottom end of the refrigerant evaporator 4 at least by a predetermined distance. In this way, the surface temperature of the tubes 41, that is, the refrigerant temperature in the refrigerant evaporator 4 can be detected accurately.

The heater core 5 is connected to a cooling water circuit (not shown) of the vehicle engine through a hot water pipe (not shown). The heater core 5 heats air passing therethrough by using engine cooling water, heated in cooling operation of the vehicle engine, as a heat source. An air amount passing through the heater core 5 and an air amount bypassing the heater core 5 are adjusted by an air mixing door 26. The inside-outside air switching door 8, the air outlet doors 12a–14a and the air mixing door 26 are respectively operated by actuators. Each actuator is controlled based on a control signal output from the control unit 16 through a drive circuit (not shown).

Detection signals of sensors are input to the control unit 16 through an input interface 39 while operation signals set in an operation panel 17 are input thereto. Here, the sensors includes an inside air temperature sensor 33, an outside air temperature sensor 34, a sunlight sensor 35, a post-evaporator sensor 36, a water temperature sensor 37, the freezing-prevention temperature sensor 32 and a potentiometer 38. The inside air temperature sensor 33 detects an air temperature in the passenger compartment, and the outside air temperature sensor 34 detects an air temperature outside the passenger compartment. The sunlight sensor 35 detects a sunlight amount radiated into the passenger compartment, and the post-evaporator sensor 36 detects an air temperature at an outlet side of the refrigerant evaporator 4. That is, the post-evaporator sensor 36 is disposed to detect the temperature of air immediately after passing through the refrigerant evaporator 4. The water temperature sensor 37 detects a temperature of engine cooling water, and the freezing-prevention temperature sensor 32 detects the surface temperature of the tube 41 of the refrigerant evaporator 4. The potentiometer 38 detects an open degree of the air mixing door 26, so that conditioned air having a predetermined temperature can be obtained.

The operation panel 17 is disposed on an instrument panel (not shown) at a front side position of a driver seat. The operation panel 17 includes an automatic switch, an off switch, a temperature setting switch, a set temperature display, an inside-outside air selecting switch, an air conditioning switch, an air amount switch and an air outlet mode switch. The automatic switch outputs a command for automatically controlling each air conditioning component of the refrigeration device, and the off switch outputs a command for stopping operation of the refrigeration device. The temperature setting switch is used for setting an air temperature in the passenger compartment at a desired temperature, and the set temperature display is used for digitally displaying the set temperature. The inside-outside air setting switch is used for manually setting any one of an outside air introduction mode and an inside air introduction mode. Outside air is introduced into the air conditioning case 2 in the outside air introduction mode, and inside air is introduced into the air conditioning case 2 in the inside air introduction mode.

The air conditioning switch is used for manually switching between a start operation of the refrigerant cycle S and a stop operation of the refrigerant cycle S. That is, energization (on) and de-energization (OFF) of the solenoid clutch 18a provided in the refrigerant compressor 18 can be manually switched by the air conditioning switch. The air amount switch is used for changing an air amount of the blower 3 stepwise, at three steps of a high level (maximum air amount), an intermediate level (intermediate air amount) and a low level (minimum air amount) in the first embodiment. The air outlet mode switch is used for manually setting the air outlet mode. Further, the input interface 39 converts analog signals of the sensors 32–37 and the potentiometer 38 to digital signals, and outputs the converted digital signals to the control unit 16.

The control unit 16 includes a read only memory (ROM) 16a, a random access memory (RAM) 16b and a central processing unit (CPU) 16c. Further, the control unit 16 obtains a basis signal by a basis signal generator (not shown) including a crystal oscillator, and the basis signal is used as timing control. The ROM 16a stores a formula used for calculating a target air temperature TAO, a formula used for calculating a target open degree SW of the air mixing door 26, initial data of an air introduction mode control characteristic, initial data of an air outlet mode control characteristic, initial data of a blower control characteristic, initial data of an air-conditioning control characteristic, initial data of a compressor control characteristic, initial data of a water-temperature control characteristic, a freezing prevention control program, a predetermined control program and the like. The RAM 16b stores transient data generated in the control processing of the control unit 16. The CPU 16c performs various calculations and process based on the control programs stored in the ROM 16a.

Next, the freezing prevention system of the refrigeration device will be described with reference to the freezing prevention control program. The freezing prevention control program is performed, while the operation of the refrigerant cycle S is operated by turning on the automatic switch. When the refrigerant cycle S is operated, refrigerant is compressed by the refrigerant compressor 18. Further, low-temperature low-pressure refrigerant after being cooled and decompressed flows into the refrigerant evaporator 4, thereby cooling air passing through a core portion of the refrigerant evaporator 4. The core portion of the refrigerant evaporator 4 is constructed with the plural tubes 41 and the plural fins 42. For example, when a temperature of air passing through the refrigerant evaporator 4 is low such as in a super-cooling state, water condensed on the refrigerant evaporator 4 may freeze. This freezing prevention control of the first embodiment is used to prevent the condensed water from freezing. In this freezing prevention control, the operation of the refrigerant compressor 18 is stopped based on a temperature detected by the freezing-prevention temperature sensor 32.

Figure 3:
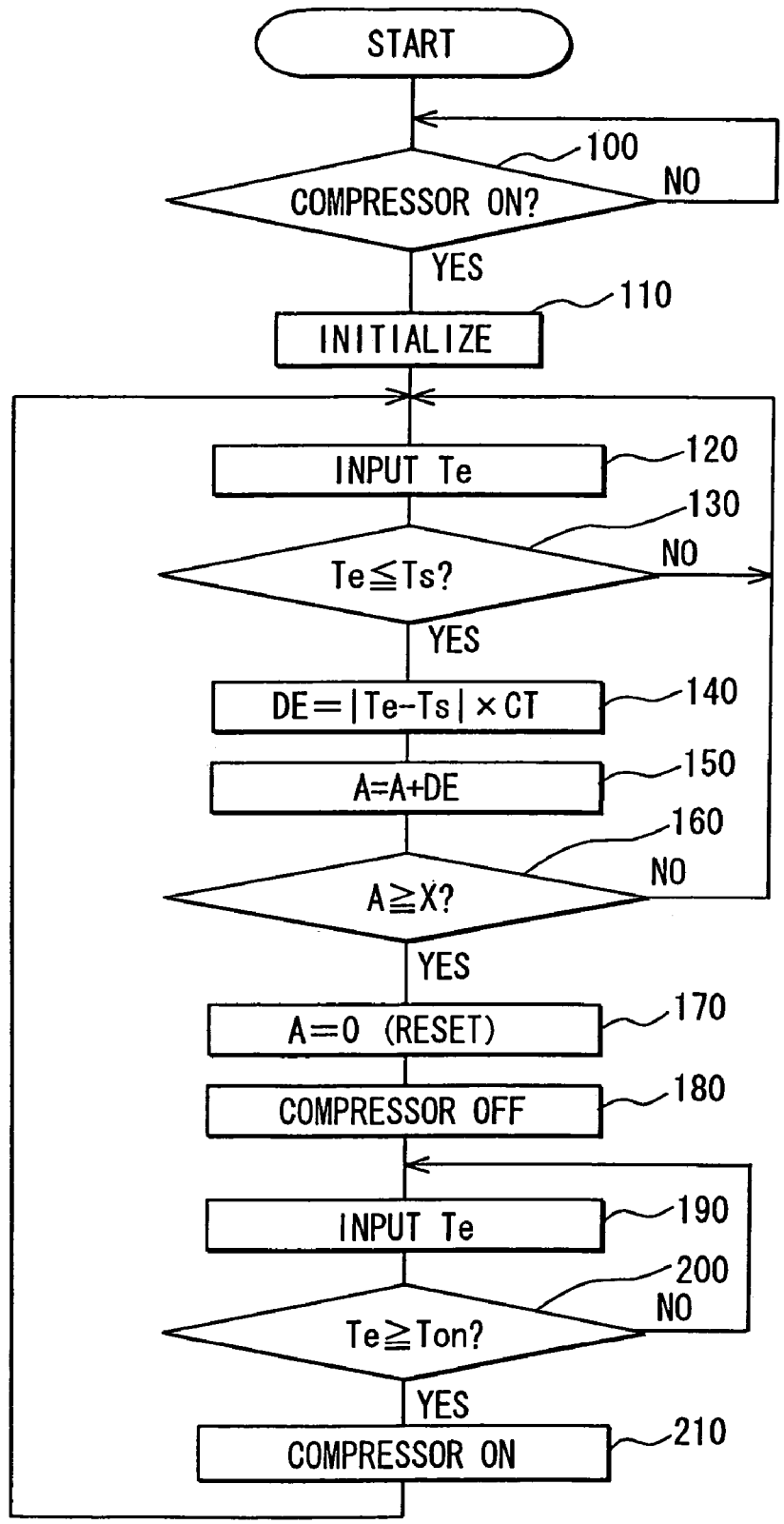
FIG. 3 is a flow diagram showing a freezing prevention control according to the first embodiment.

Specifically, as shown in FIG. 3, at step 100, it is determined whether or not the refrigerant compressor 18 is operated. When it is determined at step 100 that the refrigerant compressor 18 is operated, the control program proceeds to step 110, and the freezing prevention control is started. At step 110, transient data stored in a data process memory of the RAM 16b is initialized, and a total value A (integral value) of integrated temperature described later is reset to zero. At step 120, the control unit 16 inputs a refrigerant temperature Te detected by the freezing-prevention temperature sensor 32. At step 130, it is determined whether or not the input temperature Te is equal to or lower than an integrating start temperature Ts. The integrating start temperature Ts (integral starting temperature) is a surface temperature (i.e., refrigerant temperature) detected by the freezing-prevention temperature sensor 32, at a time where condensed water on the outer surfaces of the tubes 41 starts freezing. The integrating start temperature Ts is beforehand set and stored in the memory.

For example, if a freezing temperature of condensed water is 0° C., the integrating start temperature Ts is substantially equal to 0° C. Accordingly, it is determined whether or not condensed water on the refrigerant evaporator 4 starts freezing, by determining whether or not the refrigerant temperature Te is lower than the integrating start temperature Ts (e.g., substantially 0° C.). When it is determined that the refrigerant temperature Te is lower than the integrating start temperature Ts, an integrating value DE is calculated at step 140. The integrating value DE is an absolute temperature difference between the refrigerant temperature Te and the integrating start temperature Ts multiplied by a cycle time CT, as shown in the following formula (1).

$$DE=|Te-Ts|\times CT \quad (1)$$

For example, the cycle time CT is a data interrupt cycle time (e.g., 25 milli-seconds) of the control process. That is, the temperature difference is multiplied by an input cycle time of the refrigerant temperature Te, thereby obtaining the integrating value DE.

At step 150, the total value A (integral value) of the integrated temperature is calculated by using the following formula (2).

$$A=A+DE \quad (2)$$

Figure 4:
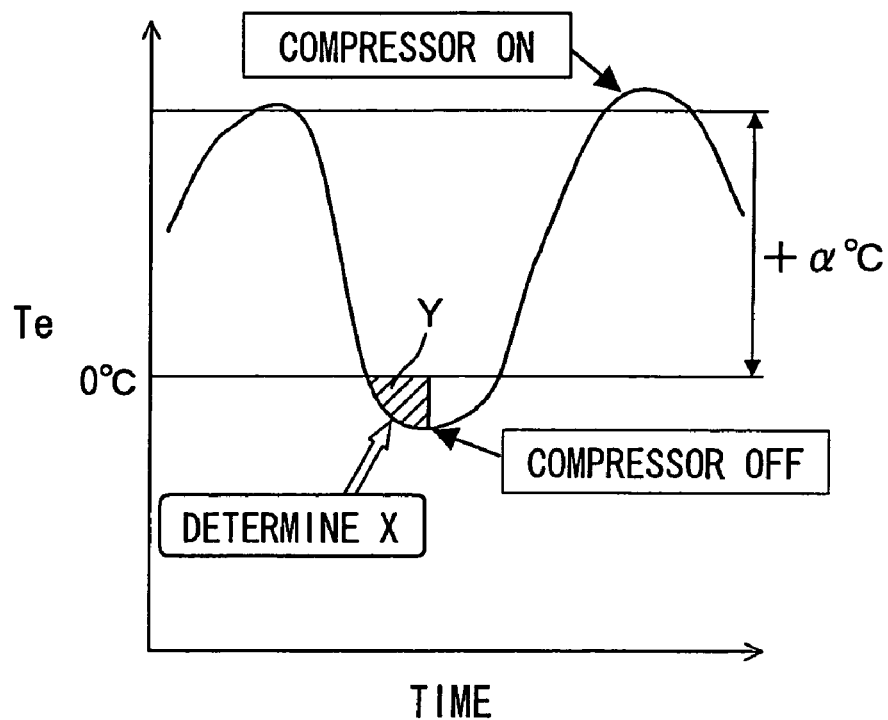
FIG. 4 is a characteristic graph showing a relationship between refrigerant temperature Te and a passing time according to the first embodiment.

That is, the integrated value calculated every input cycle is added to the past total value A of the integrated temperature, thereby obtaining the new total value A of the integrated temperature. At step 160, it is determined whether or not the new total value A of the integrated temperature is larger than a set value X stored in the memory. The set value X is obtained by studies of the present inventors, and will be now described with reference to FIG. 4. FIG. 4 is a characteristic graph showing a relationship between a passing time and a surface temperature Te detected by the freezing-prevention temperature sensor 32 in the super-cooling state, for example, when a temperature of air passing through the tubes 41 of the refrigerant evaporator 4 is low.

As described above, when the refrigerant temperature Te detected by the freezing-prevention temperature sensor 32 reduces lower than 0° C., condensed water on the refrigerant evaporator 4 starts freezing. Specifically, the condensed water between the tubes 41 freezes due to latent heat transmission from the condensed water. Accordingly, a latent heat amount in a predetermined volume of water, corresponding to an area Y in FIG. 4, is set as the set value X, and the set value X can be calculated by integrating the refrigerant temperature Te with respect to a passed time after the refrigerant temperature Te becomes lower than 0° C. In the freezing prevention control of the first embodiment, the operation of the refrigerant compressor 18 is stopped when the total value A (integral value) of the integrated temperature becomes larger than the set value X.

When it is determined at step 160 that the total value A of the integrated temperature is equal to or higher than the set value X, the control program proceeds to step 170. Then, the total value A of the integrated temperature is reset to zero at step 170, and the operation of the refrigerant compressor 18 is stopped at step 180. Thereafter, the refrigerant temperature Te is input to the control unit 16 at step 190, and it is determined at step 200 whether or not the refrigerant temperature increases to a return temperature Ton (e.g., 1° C.). When it is determined at step 200 that the refrigerant temperature Te increases to be equal to or more than the return temperature Ton, the refrigerant compressor 18 is re-started at step 210. Specifically, at steps 180, 210, the control unit 16 performs on-off control (energization control) of the solenoid clutch 18a, thereby controlling the operation state of the refrigerant compressor 18.

In the freezing prevention system according to the first embodiment, when the refrigerant temperature Te of the refrigerant evaporator 4 becomes substantially lower than 0° C., latent heat from condensed water is transmitted on the refrigerant evaporator 4, so that the condensed water starts freezing. In this case, the total value A of the integrated temperature is calculated by integrating the refrigerant temperature Te detected by the freezing-prevention temperature sensor 32, with respect to a passed time after the refrigerant temperature Te reduces substantially lower than 0° C. Further, the latent heat amount in the predetermined volume of condensed water is beforehand estimated, and is set as the set value X. Then, when the total value A of the integrated temperature becomes equal to or larger than the set value X, the operation of the refrigerant compressor 18 is stopped. Therefore, the freezing prevention control can be accurately performed by rapidly detecting the temperature at which the condensed water starts freezing.

Further, because the freezing-prevention temperature sensor 32 is disposed to detect the surface temperature of the tube 41, the temperature of refrigerant flowing through the tubes 41 in the refrigerant evaporator 4 can be accurately detected. Therefore, even when a refrigerant temperature in the refrigerant evaporator 4 having a small size rapidly changes, a response performance of the freezing prevention control with respect to the refrigerant temperature change can be effectively improved without using an additional member such as an air flow reducing member and an air flow increasing member. Thus, the freezing prevention control of the refrigerant evaporator 4 can be accurately performed in the refrigeration device in low cost.

The condensed water is generally readily stored on the tubes 41 at the lower side in the refrigerant evaporator 4. However, in the first embodiment, because the freezing-prevention temperature sensor 32 is disposed on the tube 41 at a position except the lower portion, the surface temperature of the tube 41, that is, the refrigerant temperature in the refrigerant evaporator 4 can be accurately detected. Further, because the freezing-prevention temperature sensor 32 is disposed at the downstream air position in the refrigerant evaporator 4, the freezing-prevention temperature sensor 32 is not affected by air to be introduced into the refrigerant evaporator 4, so that the refrigerant temperature can be more accurately detected.

Generally, the temperature at which condensed water on the refrigerant evaporator 4 starts freezing delays for a time with respect to the surface temperature of the tubes 41. In this embodiment, the integral value (i.e., total value A of the integrated temperature) is obtained by integrating the refrigerant temperature Te detected by the freezing-prevention temperature sensor 32, with respect to the passed time after the refrigerant temperature Te becomes substantially lower than the integrating start temperature Ts. When the total value A of the integrated temperature becomes equal to or larger than the set value X, the operation of the refrigerant compressor 18 is stopped. In this way, the refrigerant temperature Te detected by the freezing-prevention temperature sensor 32 is corrected by the integrating start temperature Ts, thereby more rapidly and more accurately detecting the freezing start temperature at which the condensed water starts freezing. Therefore, the freezing prevention control can be more accurately performed.

(Second Embodiment)

Figure 5:
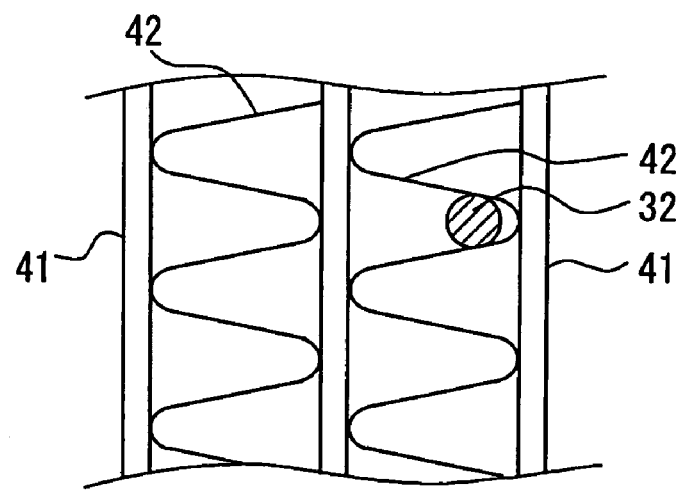
FIG. 5 is an enlarged view showing a temperature sensor provided in a refrigerant evaporator according to a second preferred embodiment of the present invention.

In the above-described first embodiment of the present invention, the freezing-prevention temperature sensor 32 is disposed to contact the tube 41 at a position except for the lower portion of the refrigerant evaporator 4. However, the freezing-prevention temperature sensor 32 can be disposed on a surface of the refrigerant evaporator 4 except for the tubes 41, to detect a surface temperature of the refrigerant evaporator 4. For example, as shown in FIG. 5, the freezing-prevention temperature sensor 32 can be disposed on the fin 42 between the tubes 41 to contact the fin 42. Even in this case, the outer surface temperature of the refrigerant evaporator 4, relating to the refrigerant temperature in the refrigerant evaporator 4, can be detected by using the freezing-prevention temperature sensor 32. That is, the temperature detected by the freezing-prevention temperature sensor 32 can be used as the refrigerant temperature. Alternatively, the freezing-prevention temperature sensor 32 can be disposed on the upper tank 45 to contact the upper tank 45. Further, the freezing-prevention temperature sensor 32 can be disposed to detect an evaporator temperature relating to the refrigerant temperature in the refrigerant evaporator 4.

In the second embodiment, the other parts including the freezing prevention control are similar to those of the above-described first embodiment, and advantages described in the first embodiment can be obtained.

OTHER EMBODIMENTS

Although the present invention has been fully described in connection with the preferred embodiments thereof with reference to the accompanying drawings, it is to be noted that various changes and modifications will become apparent to those skilled in the art.

For example, in the above-described first embodiment, it is determined at step 200 whether or not the refrigerant temperature Te becomes higher than the return temperature Ton (e.g., 1° C.). The return temperature Ton can be set at a value obtained by integrating the refrigerant temperature Te with respect to a passed time after the refrigerant temperature Te increases equal to or higher than 0° C. Therefore, release of the freeze prevention control can be accurately determined. In this case, a temperature sensor used for re-starting the operation of the refrigerant compressor 18 is not required, but the freezing-prevention temperature sensor 32 can be used as the temperature sensor. Therefore, production cost of the freezing prevention system can be reduced, while the freezing prevention control the freeze prevention system can be accurately performed.

In the above-described embodiments, the refrigerant compressor 18 is driven by the vehicle engine through the solenoid clutch 18a, and the on-off operation control of the refrigerant compressor 18 is performed by controlling the solenoid clutch 18a. However, for example, the on-off operation control of an electric compressor may be performed by controlling an electric motor of the electric compressor. Further, the present invention may be applied to a refrigeration device or an air conditioner including the refrigerant cycle S, without being limited to the vehicle air conditioner in the above embodiments.

Such changes and modifications are to be understood as being within the scope of the present invention as defined by the appended claims.

What is claimed is:

1. A freezing prevention system for a refrigeration device including a refrigerant compressor for compressing and discharging refrigerant and a refrigerant evaporator for evaporating the refrigerant after being cooled and decompressed, the freezing prevention system comprising:
a temperature detection unit disposed in the refrigerant evaporator, for detecting a refrigerant temperature in the refrigerant evaporator; and
a control unit for controlling operation of the refrigerant compressor based on the refrigerant temperature detected by the temperature detection unit, wherein;
the control unit includes a calculating means for calculating an integral value of the detected refrigerant temperature integrating with respect to a passed time after the detected refrigerant temperature becomes equal to or lower than a predetermined integrating start temperature;
the control unit stops the operation of the refrigerant compressor when the integral value calculated by the calculating means becomes equal to or larger than a predetermined value;
the control unit further includes another calculating means for calculating another integral value of detected refrigerant temperature integrating with respect to a passed time after the detected refrigerant temperature becomes higher than the predetermined integrating start temperature; and
the control unit re-starts the operation of the refrigerant compressor when the another integral value calculated by the another calculating means becomes equal to or larger than a predetermined re-start value.

2. The freezing prevention system according to claim 1, wherein the temperature detection unit is a temperature sensor disposed on the refrigerant evaporator to detect a surface temperature of the refrigerant evaporator.

3. The freezing prevention system according to claim 1, wherein:
the refrigerant evaporator includes a plurality of tubes in which the refrigerant after being cooled and decompressed flows, and a plurality of fins each of which is disposed between the tubes; and
the temperature detection unit is a temperature sensor arranged on one tube among the tubes to detect a surface temperature of the one tube.

4. The freezing prevention system according to claim 3, wherein:
the tubes are arranged to extend in a vertical direction of the refrigerant evaporator; and
the temperature sensor is arranged on the one tube at a position separated at least by a predetermined distance from a bottom end of the refrigerant evaporator in the vertical direction.

5. The freezing prevention system according to claim 1, wherein the predetermined integrating start temperature is a temperature at which condensed water on the refrigerant evaporator starts freezing.

6. The freezing prevention system according to claim 2, wherein:
the refrigerant evaporator includes a plurality of tubes in which the refrigerant after being cooled and decompressed flows, and a plurality of fins each of which is disposed between the tubes; and
the temperature detection unit is a temperature sensor arranged on one fin among the fins to detect a surface temperature of the one fin.

7. A freezing prevention system for a refrigeration device including a refrigerant compressor for compressing and discharging refrigerant and a refrigerant evaporator for evaporating the refrigerant after being cooled and decompressed, the freezing prevention system comprising:
a temperature detection unit disposed in the refrigerant evaporator, for detecting a refrigerant temperature in the refrigerant evaporator; and
a control unit for controlling operation of the refrigerant compressor based on the refrigerant temperature detected by the temperature detection unit, wherein;
the control unit includes a calculating means for calculating an integral value of the detected refrigerant temperature integrating with respect to a passed time after the detected refrigerant temperature becomes equal to or lower than a predetermined integrating start temperature;

the control unit stops the operation of the refrigerant compressor when the integral value calculated by the calculating means becomes equal to or larger than a predetermined value; and the predetermined value is calculated by a latent heat amount in a predetermined volume of the condensed water in the refrigerant evaporator.

8. The freezing prevention system according to claim 7, wherein the control unit re-starts the operation of the refrigerant compressor when the detected refrigerant temperature is higher than a predetermined re-start value.

9. An air conditioner comprising an air conditioning case for defining an air passage through which air flows into a compartment;

a refrigerant cycle including a compressor for compressing refrigerant, a condenser that cools refrigerant discharged from the compressor, a decompression unit for decompressing refrigerant from the condenser, and an evaporator disposed in the air conditioning case to cool air by evaporating refrigerant form the decompression unit;

a temperature detection unit for detecting a temperature of the evaporator, relating to a refrigerant temperature in the evaporator; and a control unit for controlling operation of the refrigerant compressor based on the temperature detected by the temperature detection unit, wherein:

the control unit includes a calculating means for calculating an integral value of the detected refrigerant temperature integrating with respect to a passed time after the detected temperature becomes equal to or lower than a predetermined integrating temperature;

the control unit stops the operation of the compressor when the integral value calculated by the calculating means becomes equal to or larger than a predetermined value; and the predetermined value is calculated by a latent heat amount in a predetermined volume of the condensed water in the refrigerant evaporator.

10. The air conditioner according to claim 9, wherein the temperature detection unit is a temperature sensor for detecting a surface temperature of the evaporator.

11. The air conditioner according to claim 10, wherein:

the evaporator includes a plurality of tubes through which refrigerant flows, and a plurality of fins each of which is disposed between the tubes; and the temperature sensor is disposed on one tube to detect a surface temperature of the one tube.

12. The air conditioner according to claim 10, wherein:

the evaporator includes a plurality of tubes through which refrigerant flows, and a plurality of fins each of which is disposed between the tubes; and the temperature sensor is disposed on one fine to detect a surface temperature of the one fin.

* * * * *